US011330094B2

(12) United States Patent
Robertson et al.

(10) Patent No.: US 11,330,094 B2
(45) Date of Patent: May 10, 2022

(54) EYEWEAR WITH CUSTOMIZABLE NOTIFICATIONS

(71) Applicant: Snap Inc., Santa Monica, CA (US)

(72) Inventors: John James Robertson, Los Angeles, CA (US); Andrew Joseph Bartow, Scottsbluff, NE (US); Samuel Ahn, Marina Del Rey, CA (US); Matthew Du, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 264 days.

(21) Appl. No.: 16/370,219

(22) Filed: Mar. 29, 2019

(65) Prior Publication Data

US 2020/0314228 A1    Oct. 1, 2020

(51) Int. Cl.
*H04M 1/72412* (2021.01)
*H04W 4/20* (2018.01)

(52) U.S. Cl.
CPC ......... *H04M 1/72412* (2021.01); *H04W 4/20* (2013.01)

(58) Field of Classification Search
CPC ..... H04M 1/72412; H04W 4/20; H04W 4/12; G06F 9/542
See application file for complete search history.

(56) References Cited

U.S. PATENT DOCUMENTS

| 8,660,522 | B1 * | 2/2014 | Henry, Jr. | .......... G06Q 30/0235 |
| | | | | 455/406 |
| 9,729,712 | B2 * | 8/2017 | Sougen | ................. H04M 3/436 |
| 2008/0259211 | A1 * | 10/2008 | Kraft | .................... H04N 21/435 |
| | | | | 348/468 |
| 2009/0013052 | A1 | 1/2009 | Robarts et al. | |
| 2012/0149342 | A1 | 6/2012 | Cohen et al. | |
| 2013/0286163 | A1 * | 10/2013 | Dror | .................... H04N 13/341 |
| | | | | 348/47 |

(Continued)

FOREIGN PATENT DOCUMENTS

WO    WO-2020205223 A1    10/2020

OTHER PUBLICATIONS

"International Application Serial No. PCT US2020 023096, International Search Report dated Jun. 12, 2020", 4 pgs.

(Continued)

*Primary Examiner* — Dominic E Rego
(74) *Attorney, Agent, or Firm* — Schwegman Lundberg & Woessner, P.A.

(57) ABSTRACT

Systems and methods for generating an alert on an eyewear device are provided. The systems and methods include receiving, by an eyewear device, from a mobile device, data indicative of a first combination of notification attributes that trigger a first alert on the eyewear device; determining that the mobile device has received a new notification based on additional data received from the mobile device; determining that a combination of attributes of the new notification matches the first combination of notification attributes; and in response to determining that the combination of the attributes of the new notification matches the first combination of notification attributes, retrieving from a storage device of the eyewear device, a first visual indicator animation that represents the first alert; and activating a visual indicator of the eyewear device in accordance with the retrieved first visual indicator animation to generate the first alert on the eyewear device.

20 Claims, 10 Drawing Sheets

(56) References Cited

U.S. PATENT DOCUMENTS

| | | | |
|---|---|---|---|
| 2015/0341900 A1* | 11/2015 | Jeong | H04L 51/24 |
| | | | 455/458 |
| 2016/0006710 A1* | 1/2016 | Palme | H04L 63/045 |
| | | | 380/260 |
| 2016/0009411 A1* | 1/2016 | Davalos | G06F 3/012 |
| | | | 345/156 |
| 2017/0111500 A1* | 4/2017 | Sougen | G06F 16/00 |
| 2017/0185650 A1* | 6/2017 | Vainas | H04M 1/72454 |
| 2017/0201886 A1* | 7/2017 | Yang | H04W 12/35 |
| 2017/0208566 A1* | 7/2017 | Yeung | H04W 68/005 |
| 2017/0223163 A1* | 8/2017 | Li | G06F 1/3215 |
| 2019/0235936 A1* | 8/2019 | Murdock | G06F 9/542 |
| 2019/0394638 A1* | 12/2019 | Iida | H04W 12/50 |
| 2020/0196122 A1* | 6/2020 | Junk | H04L 9/3013 |

OTHER PUBLICATIONS

"International Application Serial No. PCT US2020 023096, Written Opinion dated Jun. 12, 2020", 5 pgs.

* cited by examiner

EYEWEAR WITH CUSTOMIZABLE NOTIFICATIONS

BACKGROUND

Some electronics-enabled eyewear devices, such as so-called smart glasses, allow users to selectively capture images and video while a user is engaged in some activity. Such devices include an integrated camera which can be selectively activated to capture images of a user's environment. Such images can then be downloaded to a user's mobile device and shared with other users.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
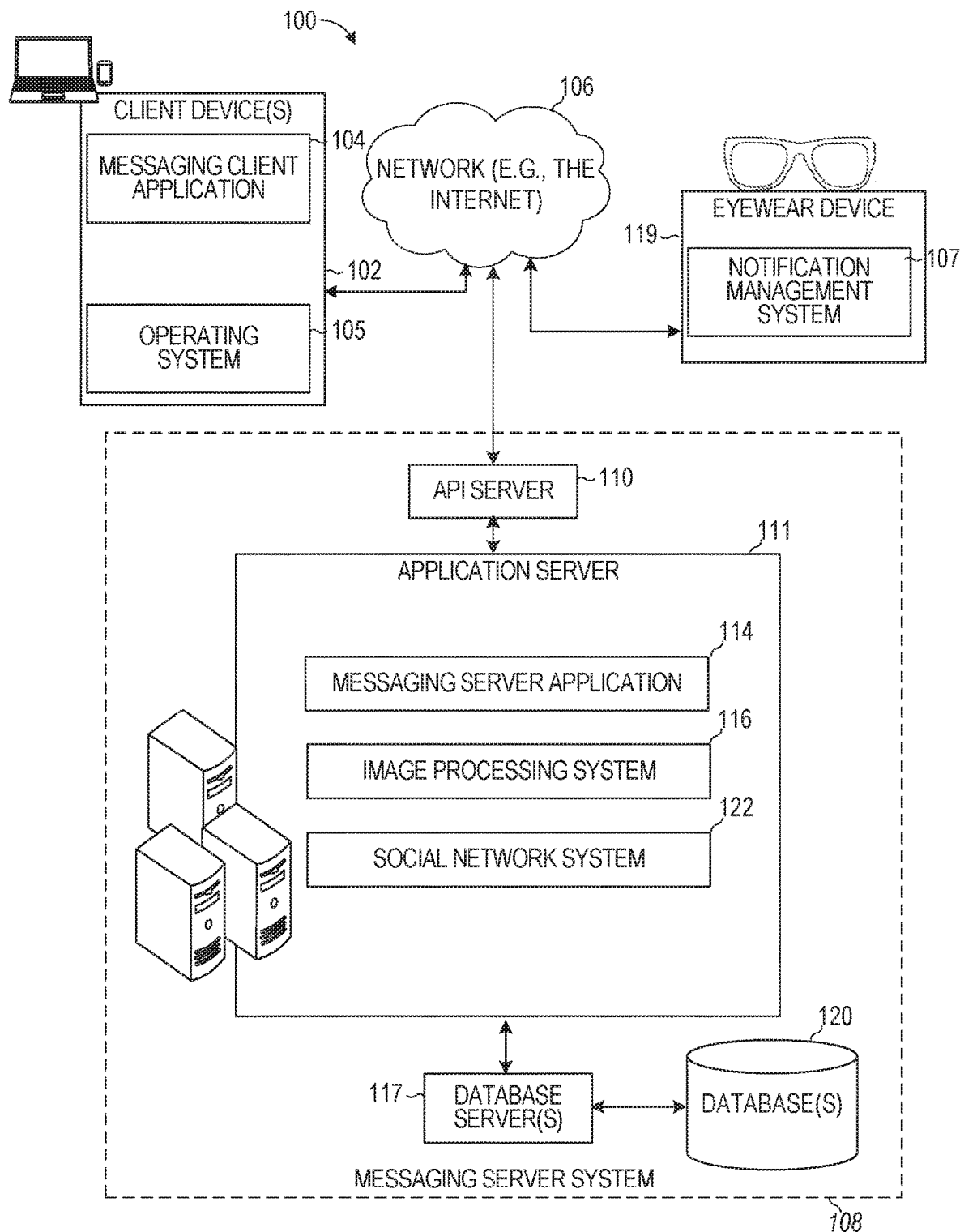
FIG. 1 is a block diagram showing an example messaging system for exchanging data (e.g., messages and associated content) over a network, according to example embodiments.

The description that follows discusses illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

Typical smart glass platforms allow users to read their text messages within the smart glasses. Such platforms are configured to display all of the messages a given user receives in the lenses of the smart glasses. While such systems work well to generally provide a user with all of their messages without disengaging from an activity (e.g., without looking at the user's phone), such devices inundate the user with too much information making such presentation counterproductive. Namely, such devices fail to selectively present messages of interest to the user which, in turn, ends up frustrating the user even more and ends up distracting the users from activities they are performing.

In addition, the typical way of presenting all of the incoming messages in the lenses of the smart glasses ends up consuming a great deal of processing and battery resources. This is because such devices use standard resource intensive programming languages and operations to process the incoming messages and further use additional resources to generate such messages for display. As a result, the battery life of these typical smart glasses is very limited, requiring a user to constantly charge the smart glasses for use, which takes away from the appeal and interest of using the smart glasses.

The disclosed embodiments improve the efficiency of using the electronic device by selectively informing a user of an electronic eyewear device of incoming messages received by another device, such as a mobile phone. The user is informed about the messages as they are received by the other client device in a non-intrusive manner. Specifically, when the electronic eyewear device receives a notification from the other client device that a message or notification was received by the other client device, the electronic eyewear device processes the notification using a filtering process to determine whether the message is of interest to the user. The user of the electronic eyewear device is informed, by way of a visual indicator, such as a dedicated light emitting diode, about any notification determined to be of interest to the user. In this way, the user is not informed about notifications that are not of interest to the user which avoids distracting and disturbing the user from performing an activity.

In an implementation, the filtering process includes determining whether the notification includes prespecified notification attributes using a low power processor on the electronic eyewear device executing a low power process. Notifications that do not have the prespecified attributes are determined to not be of interest to the user and are filtered out, or simply discarded to avoid distracting the user of the electronic eyewear device. If a notification is determined to have prespecified attributes that are of interest to the user, the electronic eyewear device activates a low power visual indicator, integrated into the electronic eyewear, in the form of a red, green and blue light emitting diode. This visual indicator is activated according to a specific animation, which is user customizable, such as a particular color and/or blink pattern, that represents the particular notification which informs the user about the contents of the notification in a non-intrusive way. Because the processor executes a low power process to filter the incoming notifications, and because the visual indicator of the notifications is a low power device, the battery life of the electronic eyewear device is enhanced. This increases the efficiency, appeal and utility of electronic eyewear devices.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and an operating system 105. Each messaging client application 104 is communicatively coupled to other instances of the messaging client application 104 and a messaging server system 108 via a network 106 (e.g., the Internet). The messaging system 100 includes an eyewear device 119 which hosts a notification management system 107, among other applications. The eyewear device 119 is communicatively coupled to the client device 102 via the network 106 (which may include via a dedicated short-range communication path, such as a Bluetooth™ or WiFi direct connection).

Each messaging client application 104 is able to communicate and exchange data with another messaging client application 104 and with the messaging server system 108 and eyewear device 119 via the network 106. The data exchanged between messaging client applications 104 and between a messaging client application 104, the eyewear device 119 and the messaging server system 108 includes functions (e.g., commands to invoke functions) as well as payload data (e.g., text, audio, video, notifications, or other multimedia data).

The messaging client application 104 presents a graphical user interface to a user for customizing notifications that trigger a visual indicator animation in the eyewear device 119. For example, the graphical user interface allows a user to specify which users or friends in a contact list are of interest to the user. For such users, the user can select a first animation style for the visual indicator of the eyewear device 119. For example, the user can specify the first animation style to include a red color that flashes six times within the span of 3 seconds. The graphical user interface allows the user to associate the first animation style with the selected users or friends such that when a message (e.g., a single message service (SMS) or multimedia message) is received from such friends, the visual indicator of the eyewear device 119 is activated according to the first animation style. As another example, the graphical user interface allows a user to specify which applications implemented on the client device 102 are of interest to the user. For such applications, the user can select a second animation style for the visual indicator of the eyewear device 119. For example, the user can specify the second animation style to include a green color that flashes twice within the span of 5 seconds. The graphical user interface allows the user to associate the second animation style with the selected applications such that when the selected applications generate notifications (e.g., a flight alert, an operation status change, a reminder, a reward, and so forth), the visual indicator of the eyewear device 119 is activated according to the second animation style.

After the user confirms the selections on the messaging client application 104 indicating the different animations for the visual indicator for different users and/or applications, the client device 102 communicates the settings to the eyewear device 119 in the form of notification attributes. Particularly, the messaging client application 104 transmits to the notification management system 107 the list of animations and the associated notification attributes of each animation. The notification attributes include an application name, a title, a subtitle and message contents that represent the various users and/or apps the user selected. The notification management system 107 stores the notification attributes and the associated animation in a local non-volatile storage device.

In some embodiments, the user can access the graphical user interface on the client device 102 to view a list of previously set notifications. The user can disable, delete or modify any previously set notifications on the client device 102. In response to receiving any changes to the notifications on the client device 102, the client device 102 communicates with the notification management system 107 to effectuate those changes on the eyewear device 119. For example, if the user previously enabled notifications with a certain animation for a particular user or group of users, notification attributes and the corresponding animation are stored on the eyewear device 119. This causes the eyewear device 119 to activate the visual indicator when a message or notification is received on the client device 102 from the particular user or group of users. The user can subsequently access the graphical user interface to delete or disable the previously enabled notification for the particular user or group of users and in response, the client device communicates with the eyewear device 119 to instruct the eyewear device 119 to delete the notification attributes associated with the user or group of users. This prevents the eyewear device 119 from activating the visual indicator when a message or notification is received on the client device 102 from the particular user or group of users.

In an implementation, the messaging client application 104 and all of the other applications implemented on the client device 102 utilize the operating system 105 to trigger notifications and alerts on the client device 102. The operating system 105 receives the alerts and generates a notification, such as a vibration, on the client device 102 to inform the user that one of the applications has triggered a notification. Particularly, when the messaging client application 104 receives an SMS or other message from a user's friend on a social network system 122, the messaging client application 104 sends an instruction to the operating system 105 to trigger a notification. In response, the operating system 105 controls electronic mechanisms on the client device, such as a motor, to generate a vibration to inform the user about the message in addition to displaying a prompt identifying the message. Such notifications may be provided to the operating system 105 with a number of attributes that include the application name (e.g., the name of the messaging client application 104 or other application identifier, the title, such as SMS or the name of the contact from whom the message was received, a subtitle and message contents).

The notification management system 107 communicates with the operating system 105 of the client device 102 to receive notification attributes. Specifically, when the eyewear device 119 has established a secure BLE connection with the client device 102, the notification management system 107 may receive all of the notifications that the operating system 105 receives from one or more local applications on the client device 104. The notification management system 107 determines whether or not to activate the local visual indicator of the eyewear device 107 based on the previously defined and selected notification attributes.

For example, the notification management system 107 loads, one at a time, each previously stored notification attribute from the non-volatile memory to a volatile memory of the local processor, such as a cache line or register. The notification management system 107 also loads the currently received notification attributes into the volatile memory of the local processor and performs a simple non-complex comparison operation using the local processor. If the comparison indicates that the attributes match, the notification management system 107 obtains the animation associated with the currently loaded previously stored notification attributes and activates the local visual indicator according to the obtained animation. If the comparison indicates that any one of the attributes does not match the attributes of the received notification, the notification management system 107 loads a next notification attribute into the volatile memory location for comparison. If none of the previously stored notification attributes match the currently received notification attributes, the notification management system 107 discards the notification that was received from the operating system 105 and prevents activating the visual indicator of the eyewear device 107.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, notifications, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 111. The application server 111 is communicatively coupled to a database server 117, which facilitates access to a database 120 in which is stored data associated with messages processed by the application server 111.

Dealing specifically with the API server 110, this server 110 receives and transmits message data (e.g., commands and message payloads) between the client device 102 and the application server 111. Specifically, the API server 110 provides a set of interfaces (e.g., routines and protocols) that can be called or queried by the messaging client application 104 in order to invoke functionality of the application server 111. The API server 110 exposes various functions supported by the application server 111, including account registration; login functionality; the sending of messages, via the application server 111, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 111 hosts a number of applications and subsystems, including a messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 111 also includes an image processing system 116 that is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 111 is communicatively coupled to a database server 117, which facilitates access to a database 120 in which is stored data associated with messages processed by the messaging server application 114.

Figure 2:
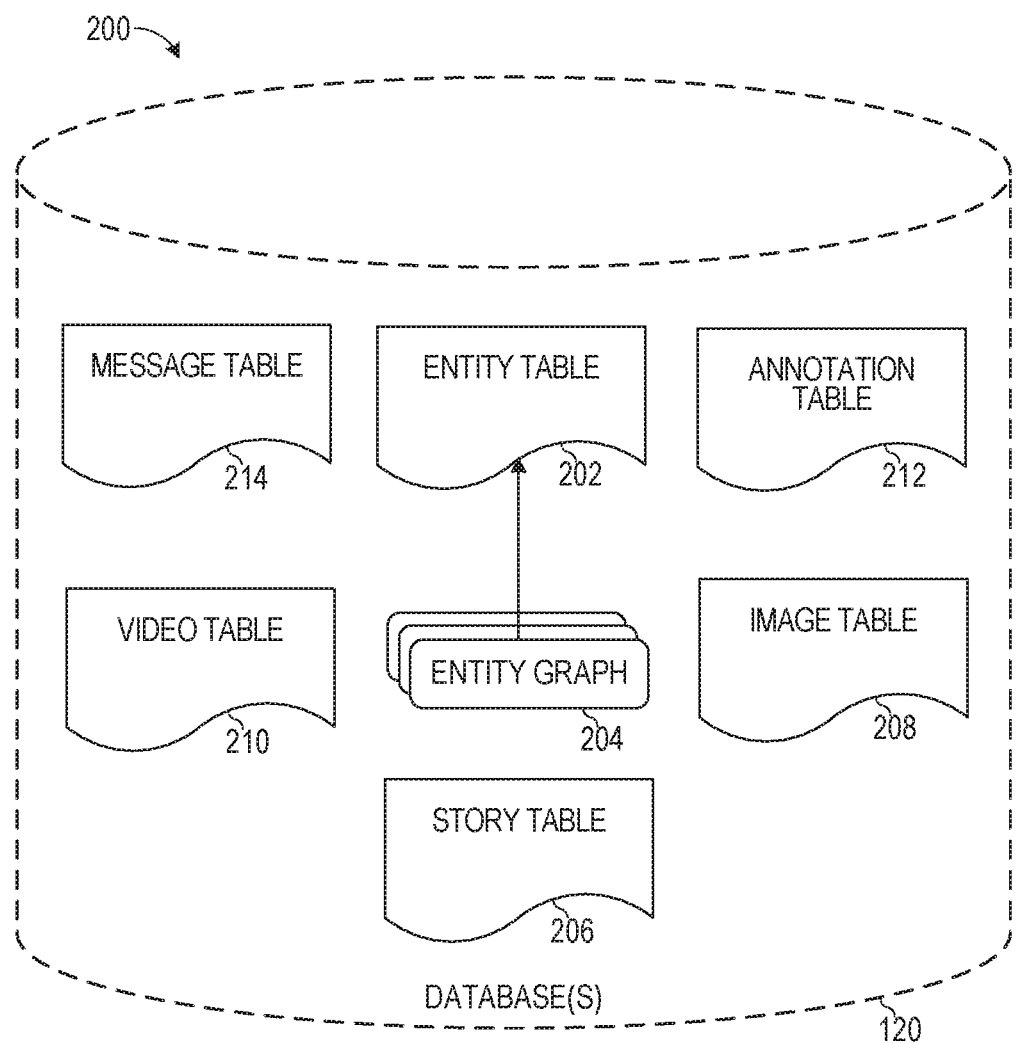
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
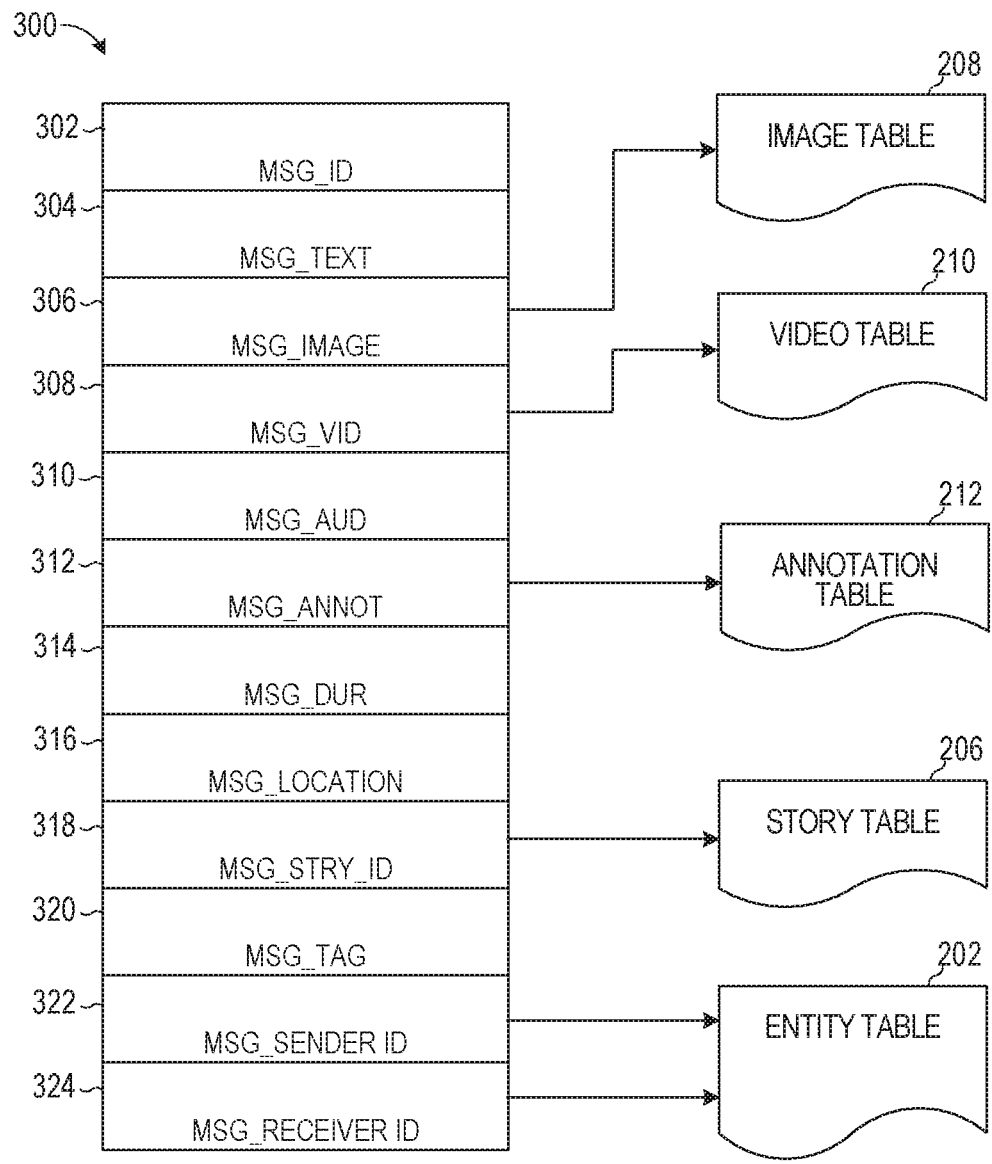
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 111. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- Message annotations 312: annotation data (e.g., filters, stickers, or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
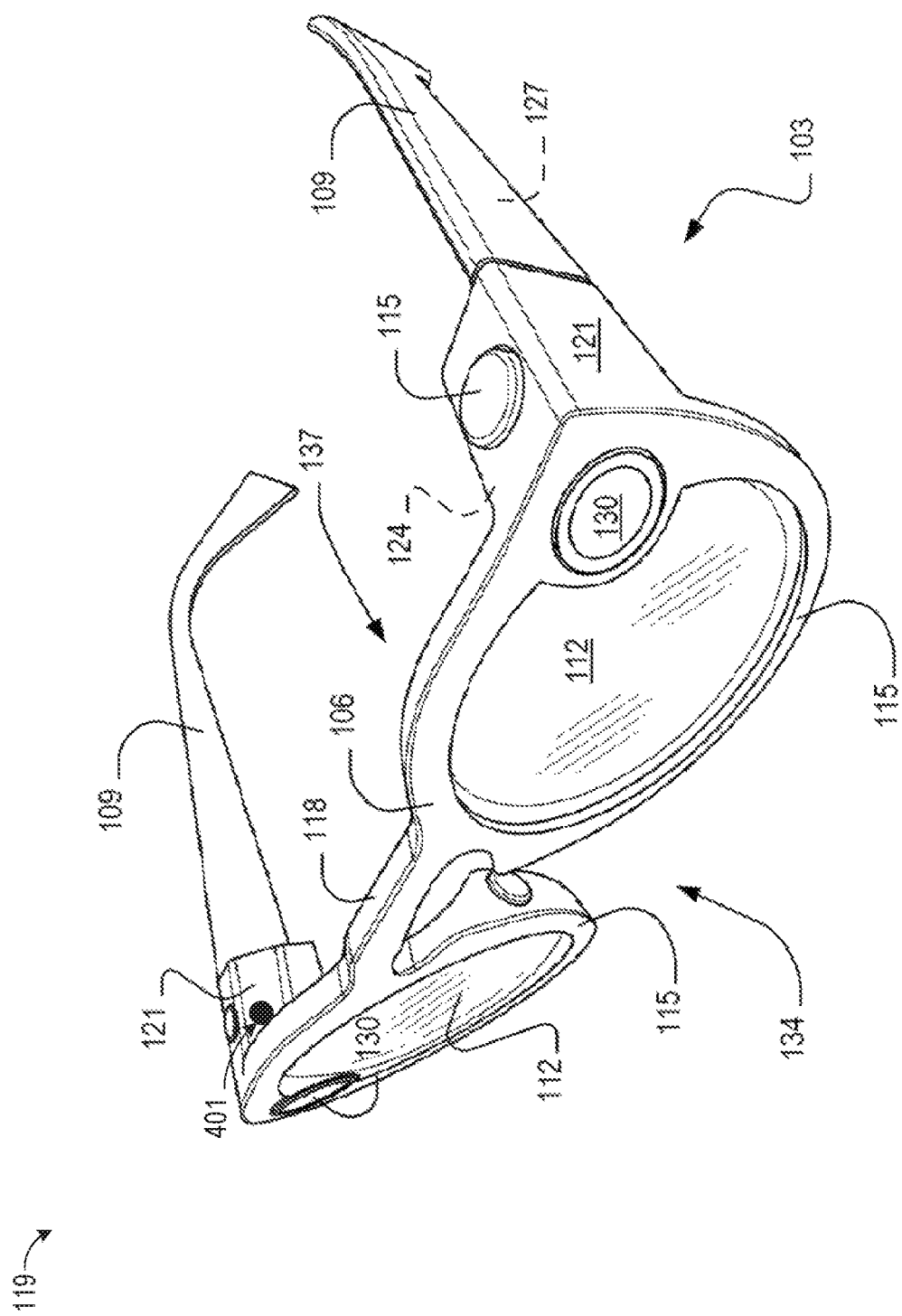
FIG. 4 is a perspective view of an eyewear device according to an example embodiment.

FIG. 4 shows a front perspective view of an eyewear device 119 in the form of a pair of smart glasses that include a notification management system 107 according to one example embodiment. The eyewear device 119 includes a body 103 comprising a front piece or frame 106 and a pair of temples 109 connected to the frame 106 for supporting the frame 106 in position on a user's face when the eyewear device 119 are worn. The frame 106 can be made from any suitable material such as plastics or metal, including any suitable shape memory alloy.

The eyewear device 119 includes a pair of optical elements in the form of a pair of lenses 112 held by corresponding optical element holders in the form of a pair of rims 115 forming part of the frame 106. The rims 115 are connected by a bridge 118. In other embodiments, one or both of the optical elements can be a display, a display assembly, or a lens and display combination.

The frame 106 includes a pair of end pieces 121 defining lateral and portions of the frame 106. In this example, a variety of electronics components are housed in one or both of the end pieces 121. The temples 109 are coupled to the respective end pieces 121. In this example, the temples 109 are coupled to the frame 106 by respective hinges so as to be hingedly movable between a wearable mode and a collapsed mode in which the temples 109 are pivoted towards the frame 106 to lie substantially flat against it. In other embodiments, the temples 109 can be coupled to the frame 106 by any suitable means, or can be rigidly or fixedly secured to the frame 106 so as to be integral therewith.

Each of the temples 109 that includes a front portion of that is coupled to the frame 106 and any suitable rear portion for coupling to the ear of the user, such as the curves or cute piece illustrated in the example embodiment of FIG. 4. In some embodiments, the frame 106 is formed of a single piece of material, so as to have a unitary or monolithic construction. In some embodiments, the whole of the body 103 (including both the frame 106 and the temples 109) can be of the unitary or monolithic construction.

The eyewear device 119 has onboard electronics components including a computing device, such as a computer 124, or low power processor, which can in different embodiments be of any suitable type so as to be carried by the body 103. In some embodiments, the computer 124 is at least partially housed in one or both of the temples 109. In the present embodiment, various components of the computer 124 is housed in the lateral end pieces 121 of the frame 106. The computer 124 includes one or more processors with memory (e.g., a volatile storage device, such as random access memory or registers), a storage device (e.g., a non-volatile storage device), wireless communication circuitry (e.g., BLE communication devices and/or WiFi direct devices), and a power source. The computer 124 comprises low-power circuitry, high-speed circuitry, and, in some embodiments, a display processor. Various embodiments may include these elements in different configurations or integrated together in different ways.

The computer 124 additionally includes a battery 127 or other suitable portable power supply. In one embodiment, the battery 127 is disposed in one of the temples 109. In the eyewear device 119 shown in FIG. 4, the battery 127 is shown as being disposed in one of the end pieces 121, being electrically coupled to the remainder of the computer 124 housed in the corresponding end piece 121.

The eyewear device 119 is camera-enabled, in this example comprising a camera 130 mounted in one of the end pieces 121 and facing forwards so as to be aligned more or less with the direction of view of a wearer of the eyewear device 119. The camera 130 is configured to capture digital images (also referred to herein as digital photographs or pictures) as well as digital video content. Operation of the camera 130 is controlled by a camera controller provided by the computer 124, image data representative of images or video captured by the camera 130 being temporarily stored on a memory forming part of the computer 124. In some embodiments, the eyewear device 119 can have a pair of cameras 130, e.g. housed by the respective end pieces 121.

As will be described in greater detail below, the onboard computer 124 and the lenses 112 are configured together to provide a notification management system 107 that automatically presents alerts to a user by animating one or more visual indicators 401, such as one or more red, green, blue light-emitting diodes (LEDs). The visual indicators 401 can be disposed on any portion of the eyewear device 119. For example, a first of the visual indicators 401 can be included on one of the end pieces 121 and a second of the visual indicators 401 (not shown) can be included on a second one of the end pieces 121. The visual indicators 401 can be animated such that they emit light with a particular color, for a particular duration of time, and that blinks on and off a particular number of times. The visual indicators 401 can operate synchronously or asynchronously. When they operate synchronously, the visual indicators 401 animate to generate the same pattern of light in the same color. When they operate asynchronously, one visual indicator emits light in a first color (orange), that blinks on and off a first number of times, where each blink is on for a first amount of time, and the other visual indicator emits light in a second color (blue), that blinks on and off a second number of times, where each blink is on for a second amount of time. The animation can be specified by a user of the client device (e.g., mobile device) 102 using a graphical user interface of the messaging client application 104.

The eyewear device 119 further includes one or more input and output devices permitting communication with and control of the camera 130. In particular, the eyewear device 119 includes one or more input mechanisms for enabling user control of one or more functions of the eyewear device 119. In this embodiment, the input mechanism comprises a button 115 mounted on the frame 106 so as to be accessible on top of one of the end pieces 121 for pressing by the user. In addition to any other functions that may be controlled by operation of the button 115, the button 115 in this example enables the user to trigger photo capture by the camera 130. In the current example embodiment, a photo capture command can be issued by a single, relatively short button press (e.g., shorter than a second), while a video capture command can be issued by a press-and-hold action.

The eyewear device 119 further includes one or more communication devices, such as Bluetooth low energy (BLE) communication interface. Such BLE communication interface enables the eyewear device 119 to communicate wirelessly with the client device 102. Other forms of wireless communication can also be employed instead of, or in addition to, the BLE communication interface, such as a WiFi direct interface. The BLE communication interface implements a standard number of BLE communication protocols.

A first of the communications protocols implemented by the BLE interface of the eyewear device 119 enables an unencrypted link to be established between the eyewear device 119 and the client device 102. In this first protocol the link-layer communication (the physical interface or medium) between the eyewear device 119 and the client device 102 includes unencrypted data. In this first protocol, the application layer (the communication layer operating on the physically exchanged data) encrypts and decrypts data that is physically exchanged in unencrypted form over the link layer of the BLE communication interface. In this way, data exchanged over the physical layer can freely be read by an eavesdropping device, but the eavesdropping device will not be able to decipher the data that is exchanged without performing a decryption operation in the application layer.

A second of the communications protocols implemented by the BLE interface of the eyewear device 119 enables an encrypted link to be established between the eyewear device 119 and the client device 102. In this second protocol, the link-layer communication (the physical interface) between the eyewear device 119 and the client device 102 receives data from the application layer and adds a first type of encryption to the data before exchanging the data over the physical medium. In this second protocol the application layer (the communication layer operating on the physically exchanged data) may or may not use a second type of encryption to encrypt and decrypt data that is physically exchanged in encrypted form, using the first type of encryption, over the link layer of the BLE communication interface. Namely, data can be first encrypted by the application layer and then be further encrypted by the physical layer before being exchanged over the physical medium. Following the exchange over the physical medium, the data is then decrypted by the physical layer and then decrypted again (e.g., using a different type of encryption) by the application layer. In this way, data exchanged over the physical layer cannot be read by an eavesdropping device as the data is encrypted in the physical medium.

Certain applications implemented on the client device 102 that utilize the eyewear device 119 allow communications between the client device 102 and the eyewear device 119 over the BLE communication interface only through the second communication protocol. For example, the messaging client application 104 may communicate with the eyewear device 119 over the first protocol in which data in the physical layer is unencrypted while the operating system 105 may only communicate with the eyewear device 119 over the second protocol in which the data in the physical layer is encrypted. In certain embodiments, the eyewear device 119 may switch from communicating with the client device 102 using the first protocol to using the second protocol based on which application is attempting to exchange data with the eyewear device 119. In certain embodiments, once the second protocol is configured to communicate with the client device 102, the eyewear device 119 will communicate with all of the applications of the client device 102 using the second protocol even any one of the applications allows communication using the first protocol.

In some embodiments, the client device 102 communicates with the eyewear device 119 using the first protocol to exchange images or videos between the messaging client application 104 and the eyewear device 119. For example, the messaging client application 104 may download from the eyewear device 119 all or a portion of the images and videos stored on the eyewear device 119 using the first protocol. In some embodiments, a user may request, by selecting an option in the messaging client application 104, to enable notification alerts in the eyewear device 119. Enabling notification alerts may cause the visual indicators of the eyewear device 119 to selectively and in a customizable manner animate to emit light patterns to represent one or more messages received by the client device 102. In such cases, the eyewear device 119 receives notifications from the operating system 105 (independently of whether the messaging client application 104 is currently running). The notifications indicate new messages being received or alerts provided and generated by one or more applications implemented on the client device 102. In response to receiving the request to enable the notification alerts, the eyewear device 119 may switch to the second protocol from the first protocol in order to enable the eyewear device to communicate with the operating system 105. To switch to the second protocol a visual dialog may be presented on the client device 102 to confirms Bluetooth communication exchange with the eyewear device 119. Once the confirmation is received from the user of the client device 102, the second protocol is utilized to communicate with the eyewear device 119.

In some embodiments, the eyewear device 119 is shared between different users and between different client device 102. For example, the eyewear device 119 may currently be communicating with a first client device 102 using the second protocol because a user of the eyewear device 119 is interested in receiving notification alerts on the eyewear device 119. Following a request received to establish a communication with a second client device 102, the eyewear device 119 may determine whether the eyewear device 102 previously communicated with the second device 102 utilizing the second communication protocol. For example, the eyewear device 119 stores in memory client device identifiers and protocol information that indicates the protocol used to communicate with the client devices. Alternatively, the eyewear device 119 stores in memory client device identifiers and indication of whether notification alerts have been enabled for that client device on the eyewear device 119. In response to determining that the second client device has not previously communicated with the eyewear device 119 using the second protocol (e.g., if the memory indicates that the client device identifier is associated with a disabled state of the notification alerts), the eyewear device 119 automatically switches to the first protocol to communicate with the second client device 102. In response to determining that the second client device has previously communicated with the eyewear device 119 using the second protocol (e.g., if the memory indicates that the client device identifier is associated with an enabled state of the notification alerts), the eyewear device 119 maintains the second protocol and establishes a communication session with the second client device 102 using the second protocol. This avoids needlessly presenting the dialog to allow Bluetooth communications using the second protocol if a given user of a client device does not have an interest receiving notification alerts when using the eyewear device 119.

Figure 5:
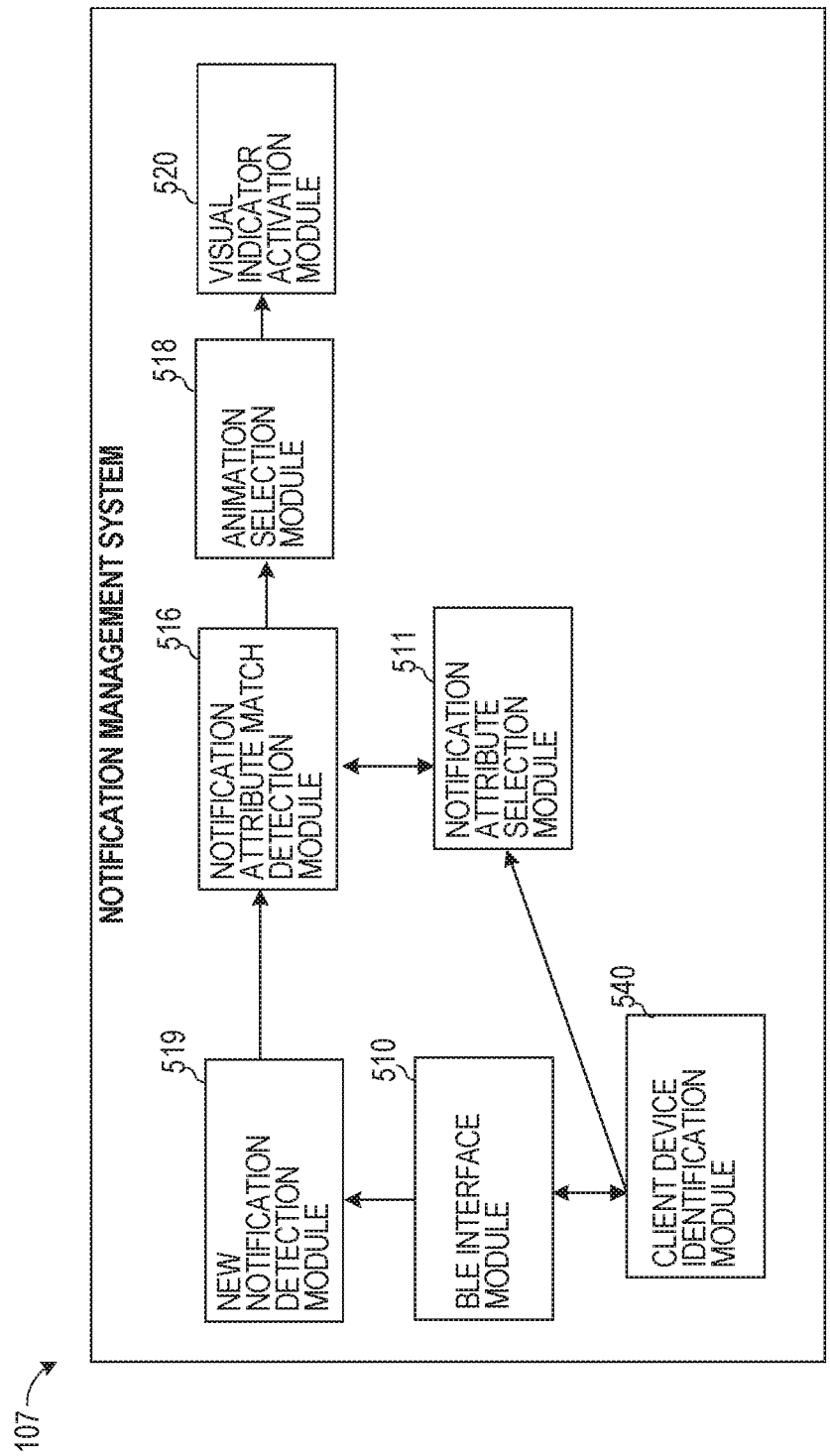
FIG. 5 is a block diagram showing an example notification management system according to an example embodiment.

FIG. 5 is a block diagram showing an example notification management system 107 according to an example embodiment. Notification management system 107 includes a client device identification module 540, a BLE interface module 510, a new notification detection module 519, a notification attribute match detection module 516, a notification attribute selection module 511, an animation selection module 518 and a visual indicator activation module 520.

BLE interface module 510 includes interface devices used to establish a BLE connection with a particular client device 102. The BLE interface module 510 implements a number of BLE protocols including the first BLE protocol in which the link layer physical data exchange is unencrypted and a second BLE protocol in which the link layer physical data exchange is encrypted.

Client device identification module 540 communicates with the BLE interface module 510 to determine a device identifier of a client device 102 with which the eyewear device 119 is communicating with. In some implementations, client device 102 transmits unencrypted messages in a broadcast manner to indicate to nearby devices that the client device 102 is ready to establish a BLE connection. Such broadcast messages include a device identifier of the client device 102 and various other Bluetooth specific parameters. The BLE interface module 510 reads the broadcast messages to obtain the device identifier. The BLE interface module 510 communicates with the client device identification module 540 to determine whether the device identifier matches any previously stored device identifiers. Namely, once the eyewear device 119 establishes a connection with a new client device 102, the eyewear device 119 stores the device identifier in the client device identification module 540. The client device identification module 540 also stores an indication of the BLE protocol used to communicate with the associated client device.

In response to determining that the device identifier received from the nearby device matches the device identifier in the client device identification module 540, the BLE interface module 510 obtains the BLE protocol stored in association with the device identifier in the client device identification module 540. For example, the BLE interface module 510 obtains the first BLE protocol along with the corresponding encryption keys used to communicate with the client device 102 associated with the particular device identifier. The BLE interface module 510 then sends a message back to the client device 102 with various BLE parameters to establish the BLE connection with the client device 102 using the first BLE protocol. In response to determining that the device identifier received from the nearby device matches the device identifier in the client device identification module 540, the client device identification module 540 sends the client device identifier to the notification attribute selection module 511.

Notification attribute selection module 511 stores in a non-volatile memory of the eyewear device 119 a list with notification attributes and corresponding visual indicator animations. The list may be associated with multiple device identifiers to allow multiple users to share access to the eyewear device 119. Only one set of notification attributes associated with the same device identifier may be active at a given time. Namely, the notification attribute selection module 511 may access or activate the list of notification attributes associated with the device identifier received from the client device identification module 540. In an implementation, the activated list may be moved to a new temporary storage location of the eyewear device 119.

In some implementations, new notification attributes are added to the list stored by the notification attribute selection module 511 as a user enables or modifies notification settings on the client device 119 (e.g., via the graphical user interface on the client device 102). For example, a user utilize the graphical user interface to enable notifications on the eyewear device 119 when video/image messages are received from a particular friend and can also specify the type of animation for the visual indicator (e.g., a red light that blinks 5 times). In response, the client device 102 sends data to the notification attribute selection module 511 with the notification attributes associated with this selection and these notification attributes are stored in the list in association with the identifier of the client device 102. In some implementations, the notification attribute selection module 511 deletes previously stored notification attributes and the corresponding visual indicator animations from the list in response to receiving data from the client device 102 indicating that the user deleted or made changes to the previously set notification attributes. For example, the user can subsequently access the graphical user interface to delete or disable notifications from the particular friend. In response, the client device 102 communicates an instruction to the notification attribute selection module 511 to delete the notification attributes associated with the particular friend from the list that is associated with the identifier of the client device 102. Notification attribute selection module 511 may then remove from the list stored in the non-volatile storage device the corresponding notification attributes to prevent activation of the visual indicator on the eyewear device 119 when messages are received from the particular friend on the client device 102.

The new notification detection module 519 receives from the BLE interface module 510 various data that is exchanged with the client device 102. In an implementation, the new notification detection module 519 determines that the given set of data corresponds to a notification that is received from the operating system 105 of the client device 102. In such cases, the new notification detection module 519 retrieves a set of attributes (e.g., application name, title, subtitle, message contents, and so forth) from the newly received notification. The new notification detection module 519 provides the set of notification attributes to the notification attribute match detection module 516.

Notification attribute match detection module 516 loads the set of attributes of the new notification into a first storage location of a volatile memory, such as a cache line or registry, of the processor of the eyewear device 119. The notification attribute match detection module 516 retrieves notification attributes of a first notification stored in the active list of the notification attribute selection module 511. For example, the retrieved notification attributes of the first notification include an application name (e.g., a messaging application identifier), a title (e.g., an SMS message), and a subtitle (e.g., a user identifier). The notification attribute match detection module 516 loads the notification attributes of the first notification into a second storage location of the volatile memory of the processor of the eyewear device 119. The notification attribute match detection module 516 instructs the processor of the eyewear device 119 to perform a storage location comparison operation (e.g., an XOR logic operation) on the first and second storage locations to determine whether the storage locations match.

In response to determining that the comparison operation indicates the storage locations fail to match (e.g., the XOR logic operation is greater than '0'), such as because at least one of the loaded attributes of the first notification (e.g., the user identifier) failed to match the user identifier stored in the newly received notification attribute (e.g., the subtitles of the newly received notification attribute is different from the subtitle of the first notification), the notification attribute match detection module 516 retrieves attributes of a second active notification from the notification attribute selection module 511. The attributes of the second notification are stored in the second storage location of the volatile memory of the processor to replace the previously stored attributes that failed to match. The notification attribute match detection module 516 instructs the processor to again compare the two storage locations to determine whether they match each other.

In response to determining that the comparison operation indicates the storage locations match (e.g., the XOR logic operation is equal to '0'), the notification attribute match detection module 516 instructs the animation selection module 518 to retrieve a visual indicator animation associated with the notification for which the attributes matched the newly received notification attributes. For example, if the attributes of the second notification retrieved from the notification attribute selection module 511 are determined to match the attributes of the newly received notification, the animation selection module 518 is instructed to obtain the animation stored in association with the second notification.

The animation selection module 518 access the list of active stored notification attributes to obtain the animation for the visual indicator associated with the matching notification. For example, the matching notification (e.g., the second notification) is associated with an animation in which a red light that flashes 5 times within the span of 3 seconds. The animation selection module 518 provides the retrieved animation to the visual indicator activation module 520. In some implementations, the animation selection module 518 stores in a non-volatile storage device a default list of animations associated with specific notification attributes. For example, a notification attribute having an application title that is a messaging application and a title being a text message can be associated with a first animation and a notification attribute having an application title that is an email application and a title being an email can be associated with a second animation. In such cases, the animation selection module 518 may obtain the notification attributes from the second storage location of the volatile memory and search a non-volatile storage device the animation that corresponds to the obtained notification attributes.

The visual indicator activation module 520 receives the animation and instructs the visual indicator 401 of the eyewear device 119 to activate according to the animation. For example, the animation specifies a red color that blinks 10 times within the span of 10 seconds. In such cases, the visual indicator activation module 520 instructs the visual indicator 401 to turn on with a red light output for 0.5 seconds, then turn off for 0.5 seconds and repeat the process for a total of 10 seconds. Any number of different animations can be specified that vary in terms of light color, duration of on time, duration of off time, and number of times the light is turned on/off in a given period.

Figure 6:
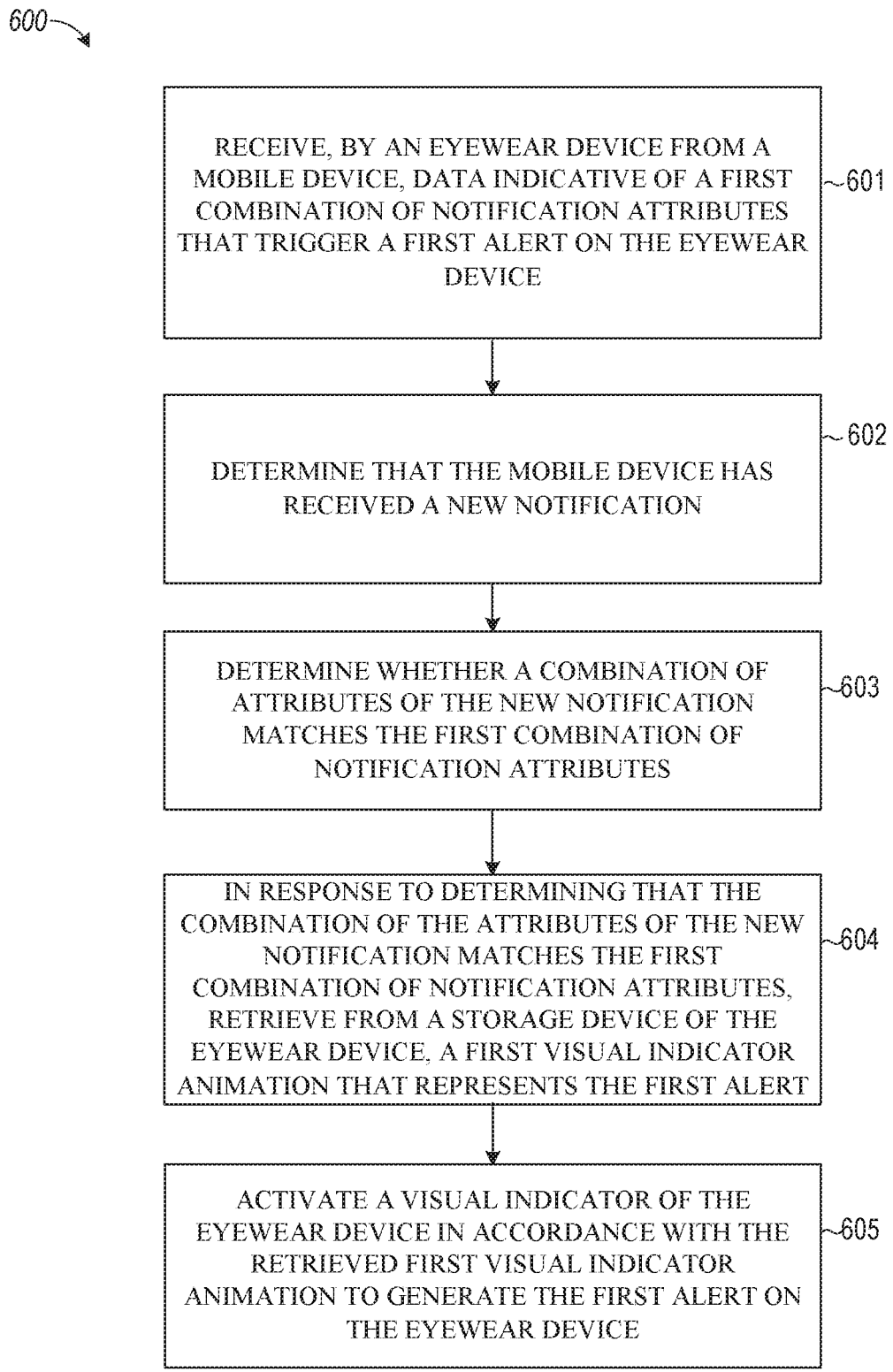
FIG. 6 is a flowchart showing example operations of the notification management system according to an example embodiment.

FIG. 6 is a flowchart illustrating example operations of the notification management system 107 in performing process 600, according to example embodiments. The process 600 may be embodied in computer-readable instructions for execution by one or more processors such that the operations of the process 600 may be performed in part or in whole by the functional components of the notification management system 107; accordingly, the process 600 is described below by way of example with reference thereto. However, in other embodiments, at least some of the operations of the process 600 may be deployed on various other hardware configurations. The process 600 is therefore not intended to be limited to the notification management system 107 and can be implemented in whole, or in part, by any other component. Some or all of the operations of process 600 can be in parallel, out of order, or entirely omitted.

At operation 601, the notification management system 107 receives, by an eyewear device from a mobile device, data indicative of a first combination of notification attributes that trigger a first alert on the eyewear device. For example, the notification attribute selection module 511 stores in a non-volatile memory of the eyewear device 119 a list of notification attributes (for one or more users) that are specified by a user of the messaging client application 104 as being of interest.

At operation 602, the notification management system 107 determines that the mobile device has received a new notification. For example, the new notification detection module 519 communicates with the operating system 105 of a client device 102 with which a BLE connection is established to received notifications that are generated locally by one or more applications implemented on the client device 102.

At operation 603, the notification management system 107 determines whether a combination of attributes of the new notification matches the first combination of notification attributes. For example, the notification attribute match detection module 516 utilizes two volatile memory locations of a processor of the eyewear device 119 to compare using simple registry operations notification attributes of the newly received notification from the operating system 105 and each active notification obtained from the notification attribute selection module 511. The notifications are sequentially loaded into the same volatile memory location and compared to reduce the amount of volatile memory locations needed.

At operation 604, the notification management system 107, in response to determining that the combination of the attributes of the new notification matches the first combination of notification attributes, retrieves from a storage device of the eyewear device, a first visual indicator animation that represents the first alert. For example, animation selection module 518 obtains an animation for a visual indicator that is associated with a given notification for which the attributes match the attributes of a newly received notification.

At operation 605, the notification management system 107 activates a visual indicator of the eyewear device in accordance with the retrieved first visual indicator animation to generate the first alert on the eyewear device. For example, the visual indicator activation module 520 activates the visual indicator 401 of the eyewear device 119 according to the animation provided by the animation selection module 518. In this way, if a particular notification has attributes identifying an SMS message received from a first friend and is associated with a first animation (e.g., red light flashing 6 times within the span of 2 seconds), the visual indicator 401 is activated according to the first animation when a newly received notification is determined to have attributes identifying the SMS message received from the first friend. As another example, if a particular notification has attributes identifying an email received from anyone and is associated with a second animation (e.g., green light flashing 2 times within the span of 2 seconds), the visual indicator 401 is activated according to the second animation when a newly received notification is determined to have attributes identifying the email message.

Figure 7:
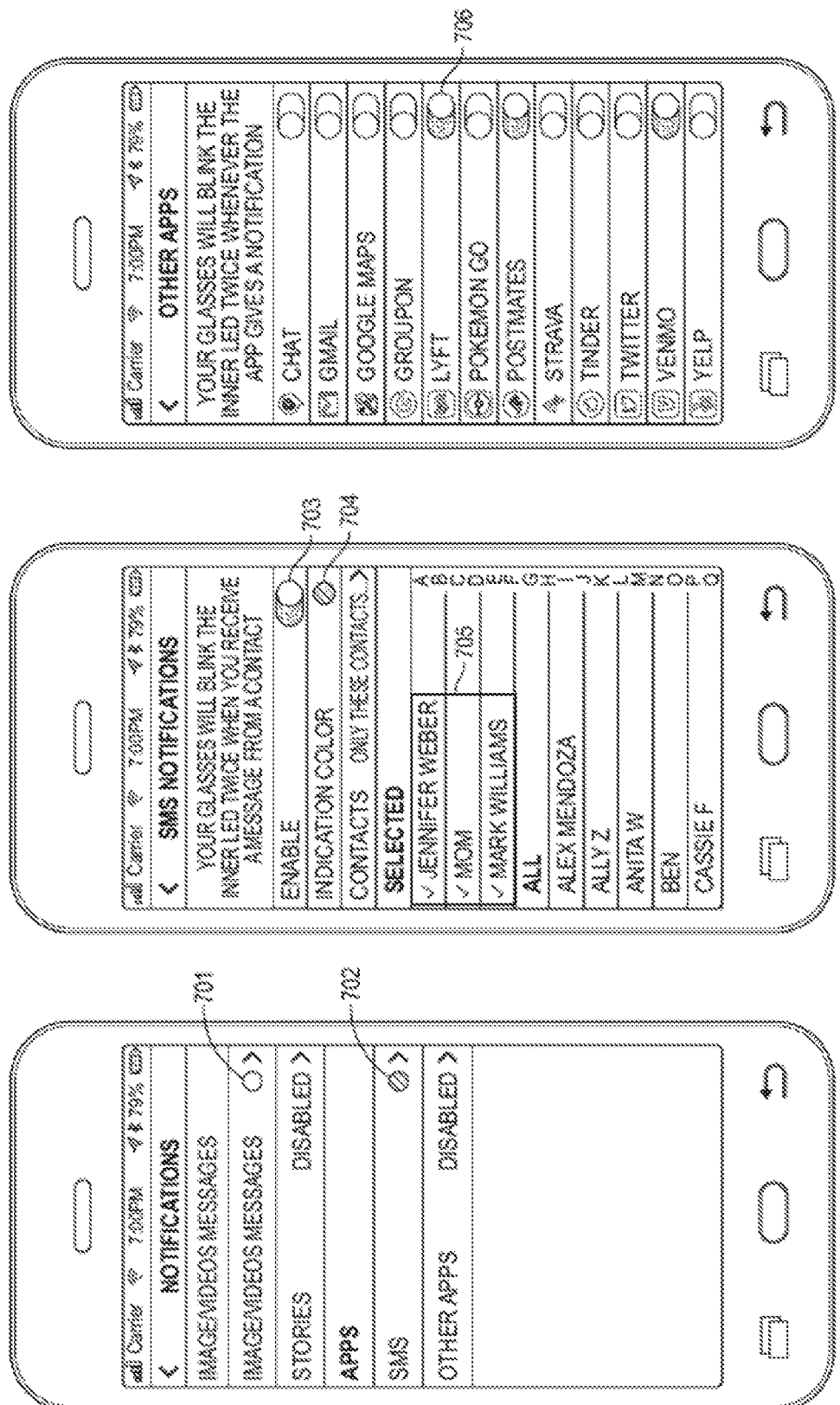
FIGS. 7-8 are illustrative screens of a graphical user interface for customizing notifications of the notification management system according to example embodiments.
Figure 8:
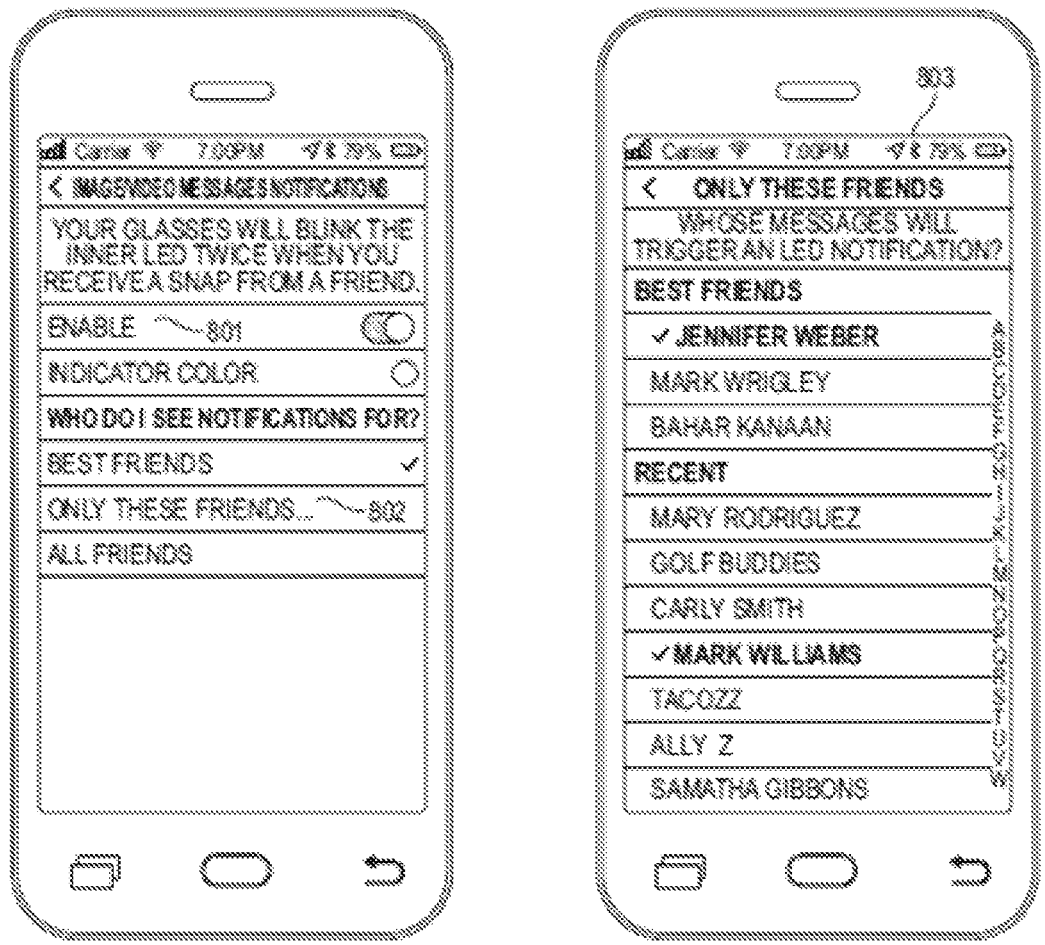

FIGS. 7-8 are illustrative screens of a graphical user interface for customizing notifications of the notification management system 107 according to example embodiments. The screens shown in FIGS. 7-8 may be provided by the messaging client application 104 of one or more client devices 102 and/or other applications implemented on one or more client devices 102. In an implementation, a user accesses the notification menu of the messaging client application 104. The notification menu allows a user to enable notifications on the eyewear device 119. As discussed previously, when notifications are enabled for the first time for a given client device 102, on the eyewear device 119 coupled to the client device 102, the eyewear device 102 switches from the first BLE protocol to the second BLE protocol which encrypts the link layer physical data that is exchanged with the client device 102.

In an embodiment, the user accesses the notifications menu and taps on or other selects an SMS menu item that is displayed. In response, a screen is presented with an enable option 703 presented in a disabled state. In response to the user tapping on or otherwise selecting enable option 703, the SMS notifications are enabled for triggering a visual indicator on the eyewear device 119. The user can select an animation for the visual indicator associated with SMS notifications using the color option 704. Other options (not shown) allow the user to specify other animation characteristics for the visual indicator, such as the blink pattern (e.g., number of blinks and duration of each blink) for the visual indicator associated with the SMS notifications. The user can vary attributes of the notification by selecting options 705 identifying contacts from whom receipt of messages trigger activation of the visual indicator. A checkmark next to a contact shown in FIG. 7 indicates that the user selected that contact, such that receipt of an SMS from that contact will trigger the visual indicator on the eyewear device 119 to be animated according to the animation selected using option 704 (and others). As shown, the user has selected a first color (e.g., green) for the option 704 which is also reflected in the indicator 702 showing that SMS messages will activate a visual indicator on the eyewear device 119 with the first color. A different color 701 can be specified for image/video messages that are received from the same or a different set of users the user can specify in FIG. 8.

As an example, after the user selects the contacts by selecting options 705, notification attributes are generated to be provided to the non-volatile storage device of the eyewear device 119. For example, the notification attributes include an application name attribute (e.g., messaging application. SMS application), a title attribute (e.g., SMS message), and a subtitle attribute (e.g., the name or names or identifiers of the users selected in the options 705).

A user can similarly configure notification attributes for various applications that are implemented on the client device 102. For example, the user can access the "other apps" option from the graphical user interface and be presented with a list of applications that are implemented or installed on the client device 102. By default, all of the notifications for each of the applications are disabled such that when the operating system of the client device 102 receives a notification from the apps on the client device 102 and delivers the notification to the eyewear device 119, the eyewear device 119 filters the notification and does not activate the visual indicator. The user can tap or otherwise select a given option 706 for each application for which the user would like the eyewear device 119 to alert the user by activating the visual indicator of the eyewear device 119. For example, the user can select the option 706 for the Lyft application (e.g., a ride sharing application). In this way, any notification that the client device 102 receives from that application (e.g., car is arriving or a new passenger is getting picked up or destination is being reached), results in the eyewear device 119 triggering the visual indicator and activating the visual indicator according to the animation associated with the selected application. As an example, the user selected a given color (e.g., blue) for the Lyft application (or for all of the listed applications for which notifications are enabled—Lyft and Venmo) which will activate a visual indicator on the eyewear device 119 with the given color when that application generates a notification on the client device 119.

The user can specify different animations for different types or urgency of alerts generated by the applications using the graphical user interface. For example, the user can select to have the visual indicator of the eyewear device 119 light up in a first color and with a first blinking pattern for when a car is arriving notification is generated by the Lyft application. Also, the user can select to have the visual indicator of the eyewear device 119 light up in a second color and with a second blinking pattern for when a destination is being reached notification is generated by the Lyft application. If any notification is marked as urgent by a given application, the user can specify a specific animation for the visual indicator that indicates an urgent notification (e.g., a red light that blinks very quickly 100 times within the span of 20 seconds).

As shown in FIG. 8, the user can select enable option 801 to enable image/video messages received from a messaging client application 104. The user can select option 802 to navigate to a graphical user interface that allows the user to select options shown in screen 803 identifying specific friends from whom receipt of image/video messages trigger activation of the visual indicator. A checkmark next to a friend shown in FIG. 8 indicates that the user selected that friend, such that receipt of an image/video message from that friend will trigger the visual indicator on the eyewear device 119 to be animated according to the animation selected for that friend. The user can select a best friends option to have image/video messages received from a pre-specified list of friends that the user has previously identified as best friends trigger notifications on the eyewear device 119. The user can select a particular animation for the visual indicator to associate with such messages received from best friends which may be different than the animation of the visual indicator that is associated with messages received from specific friends.

Figure 9:
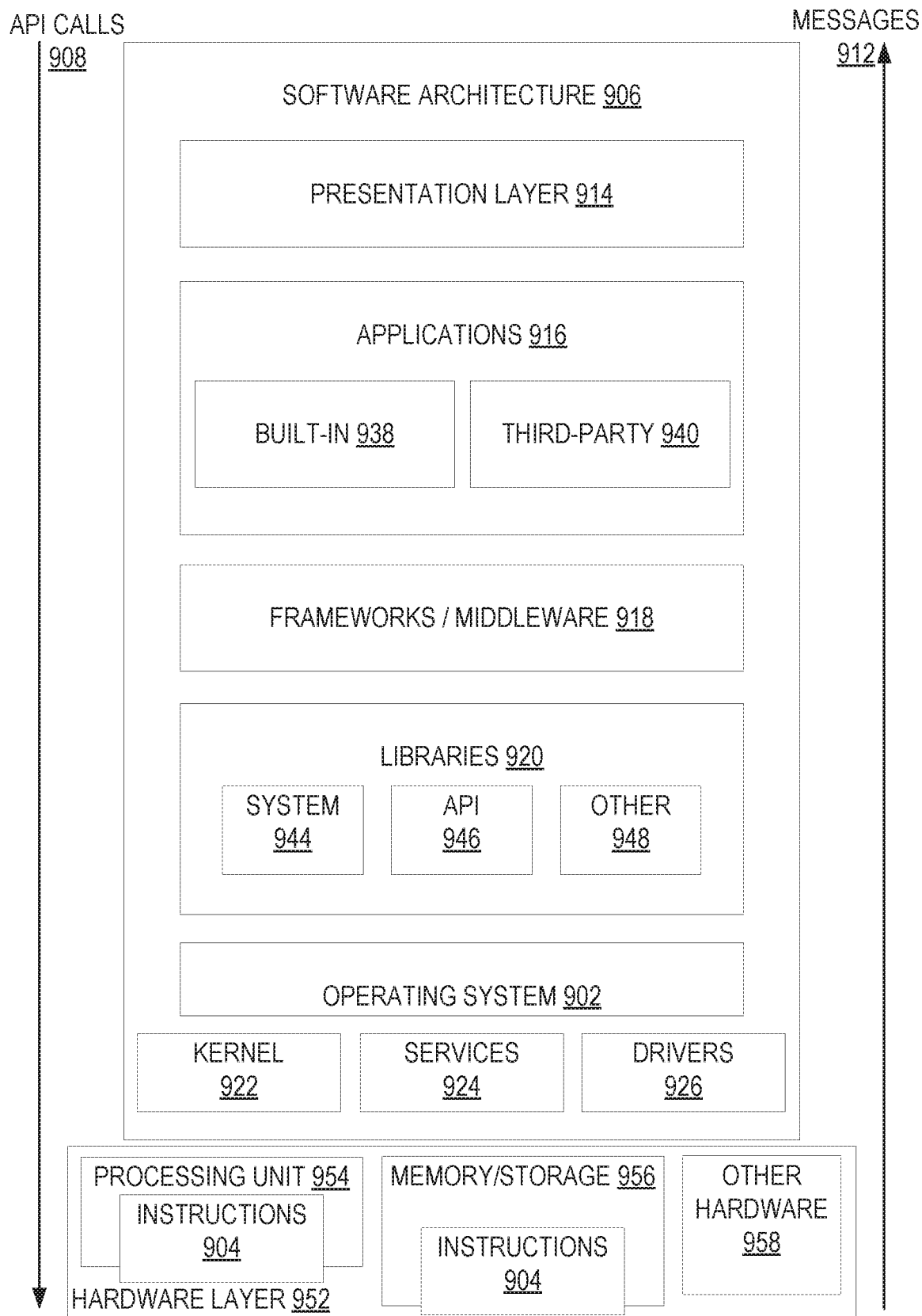
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
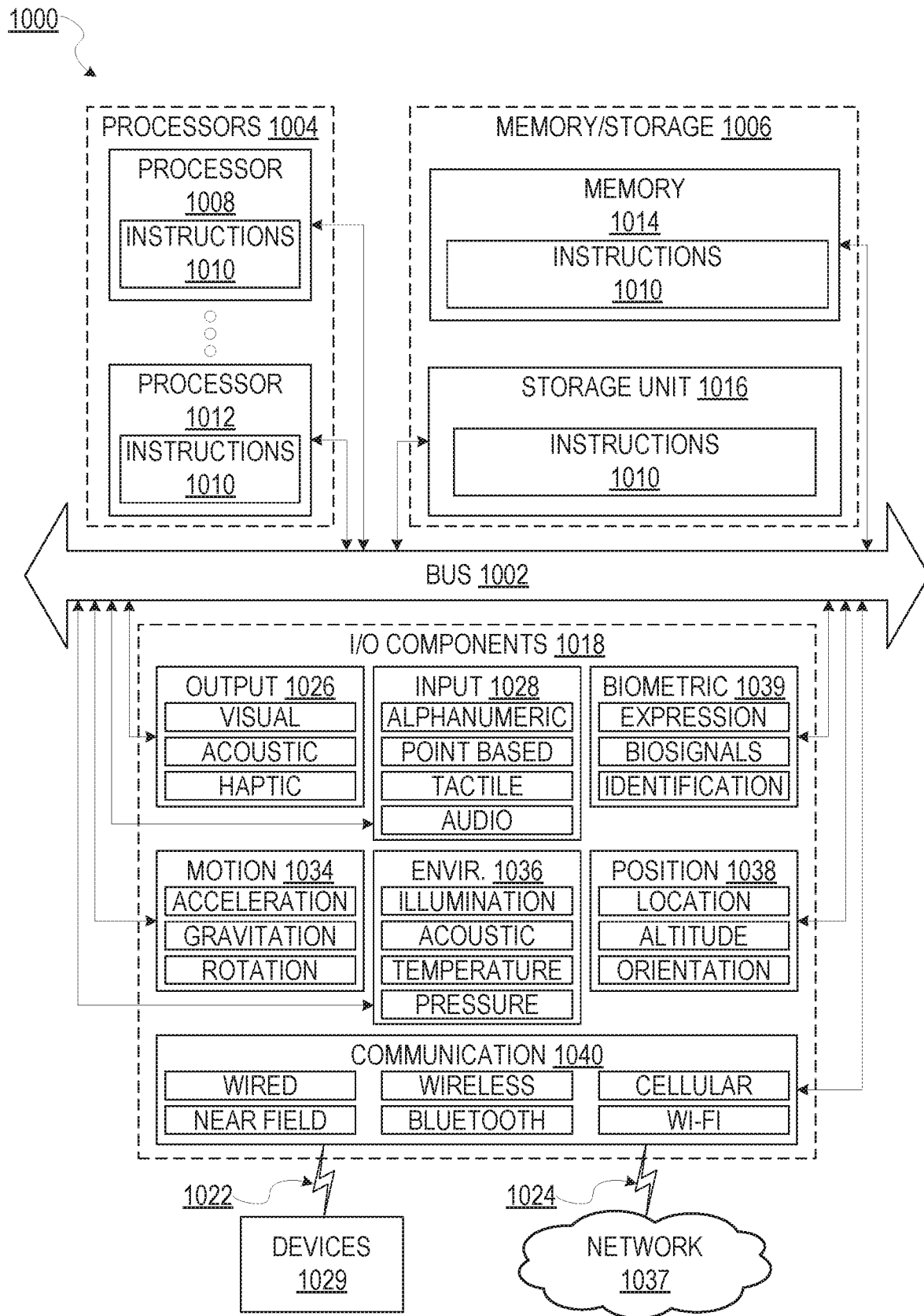
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS). High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

What is claimed is:

1. A method comprising:
receiving, by one or more processors of an eyewear device, from a mobile device, data indicative of a first combination of notification attributes that trigger a first alert on the eyewear device, the data received by the one or more processors of the eyewear device from the mobile device comprising filtering information used to control whether the first alert is triggered, based at least on a source of a given notification, and a given animation pattern of the first alert;
communicating between the eyewear device and the mobile device over a first protocol comprising an unencrypted Bluetooth Low Energy (BLE) link layer connection to transfer one or more images from the eyewear device to the mobile device;
after transferring the one or more images over the first protocol comprising the unencrypted BLE link layer connection, switching from the first protocol to a second protocol comprising an encrypted link to enable the eyewear device to communicate with an operating system of the mobile device to receive one or more notifications from the mobile device;
determining, by the one or more processors of the eyewear device, based on additional data received from the mobile device over the second protocol comprising the encrypted link, that the mobile device has received a new notification, the additional data being received by the one or more processors of the eyewear device after the data comprising the filtering information is received by the one or more processors of the eyewear device;
filtering, by the one or more processors of the eyewear device, one or more notifications received from the mobile device based on the filtering information to discard a portion of the one or more notifications received from the mobile device and maintain other notifications received from the mobile device comprising the new notification;
determining, by the one or more processors of the eyewear device, that a combination of attributes of the new notification matches the first combination of notification attributes;
in response to determining that the combination of the attributes of the new notification matches the first combination of notification attributes, retrieving, by the one or more processors of the eyewear device, from a storage device of the eyewear device, a first visual indicator animation that represents the first alert; and
activating, by the one or more processors of the eyewear device, a visual indicator of the eyewear device in accordance with the retrieved first visual indicator animation to generate the first alert on the eyewear device.

2. The method of claim 1 further comprising:
receiving, via the encrypted link, the data from a first application being executed on the mobile device; and
receiving, via the encrypted link, the new notification from an operating system of the mobile device after execution of the first application has been terminated.

3. The method of claim 1, wherein the source comprises a friend or application, wherein the first combination of notification attributes includes an application name, a title, a subtitle, and message contents, wherein the visual indicator comprises an LED, and wherein the given animation pattern included in the data received from the mobile device comprises a blink pattern for the LED.

4. The method of claim 1, further comprising:
establishing a default setting that causes all notifications of the operating device to be filtered by the eyewear device to prevent activation of the visual indicator; and
generating, for display on the mobile device, a graphical user interface that includes a first option for changing the default setting of a given application for selecting the first combination of notification attributes of the given application and a second option to selecting the first visual indicator animation.

5. The method of claim 4, wherein the first option includes at least one of a user identifier, an application identifier, or an notification type identifier.

6. The method of claim 4, wherein the second option includes at least one of a color for the visual indicator, a number of blinks of the visual indicator, a blink duration of each blink of the visual indicator, or a visual indicator animation of a second visual indicator of the eyewear device.

7. The method of claim 1, wherein the data specifies a first color for an LED for notifications comprising SMS messages, and wherein the data specifies a second color for the LED for notifications comprising images or videos received from certain users, the eyewear device being configured to capture an image in response to detecting a touch input comprising a tap having a duration shorter than a threshold, the eyewear device being configured to capture a video in response to detecting a touch input comprising a press-and-hold action.

8. The method of claim 1 further comprising:
storing, in the storage device of the eyewear device, the first combination of notification attributes in a list that associates a plurality of combinations of notification attributes with corresponding visual indicator animations, the list being first list associated with a first device identifier; and
storing a second list that associates another plurality of combinations of notification attributes with corresponding visual indicator animations for a second device identifier, wherein at a given time only the notification attributes of the first or second list is active and moved to a new temporary storage location of the eyewear device.

9. The method of claim 8, wherein determining that the combination of attributes of the new notification matches the first combination of notification attributes comprises:
retrieving a given combination of notification attributes from a first position in the list;
loading, into a memory of the one or more processors, the retrieved given combination of the notification attributes and the attributes of the new notification;
comparing each attribute of the retrieved given combination of the notification attributes with each corresponding attribute of the attributes of the new notification by performing a non-complex comparison operation using the one or more processors of the eyewear device;
in response to determining that each attribute of the retrieved given combination of the notification attributes matches each corresponding attribute of the attributes of the new notification, retrieving the visual indicator animation associated with the given combination of notification attributes.

10. The method of claim 9 further comprising in response to determining that at least one of the attributes of the retrieved given combination of the notification attributes fails to match the corresponding attribute of the attributes of the new notification:
retrieving a next combination of notification attributes from a second position in the list adjacent to the first position;
replacing the retrieved given combination of the notification attributes that has been loaded into the memory of the one or more processors with the retrieved next combination of notification attributes; and
repeating the comparing operation.

11. The method of claim 9, wherein a first portion of the plurality of combinations of notification attributes is associated with a first user of the eyewear device, and wherein a second portion of the plurality of combinations of notification attributes is associated with a second user of the eyewear device, further comprising:
determining an identity of the mobile device; and
selecting between the first portion and the second portion of the plurality of combinations of notification attributes based on the identity of the mobile device.

12. The method of claim 1, wherein the source of the given notification comprises a ride sharing application, further comprising establishing a first blinking pattern for the visual indicator associated with a first status received from the ride sharing application and establishing a second blinking pattern for the visual indicator associated with a second status received from the ride sharing application, the second status representing a new passenger getting picked up.

13. The method of claim 1, wherein the visual indicator comprises a first LED included in a first of a pair of end pieces of the eyewear device.

14. The method of claim 13, wherein a second LED is included in a second of the pair of end pieces of the eyewear device, further comprising operating the first LED and the second LED asynchronously to generate different patterns of light to generate the first alert.

15. The method of claim 1, further comprising:
loading, into a first storage location of the eyewear device, the first combination of notification attributes;
loading, into a second storage location of the eyewear device, the attributes of the new notification; and
performing an XOR logic operation on the first and second storage locations to determine whether contents of the first and second storage locations match, wherein the first alert is triggered in response to determining that the first and second storage locations match.

16. The method of claim 1 further comprising:
receiving from the mobile device a request to activate notification alerts on the eyewear device; and
switching to an encrypted BLE link layer connection between the eyewear device and the mobile device in response to receiving the request to activate the notification alerts on the eyewear device.

17. The method of claim 16, wherein switching to the encrypted BLE link layer connection comprises presenting a Bluetooth dialog on the mobile device to establish the encrypted BLE link layer connection.

18. The method of claim 17 further comprising:
detecting, by the eyewear device, a new mobile device with which to establish a BLE connection;
determining, by the eyewear device, that the notification alerts is in a disabled state for the new mobile device; and
in response to determining that the notification alerts is in the disabled state for the new mobile device, establishing the unencrypted BLE link layer connection between the eyewear device and the new mobile device without presenting the Bluetooth dialog on the new mobile device.

19. A system comprising:

a storage device of an eyewear device; and a processor of an eyewear device configured to perform operations comprising:

receiving, from a mobile device, data indicative of a first combination of notification attributes that trigger a first alert on the eyewear device, the data received by the processor of the eyewear device from the mobile device comprising filtering information used to control whether the first alert is triggered, based at least on a source of a given notification, and a given animation pattern of the first alert;

communicating between the eyewear device and the mobile device over a first protocol comprising an unencrypted Bluetooth Low Energy (BLE) link layer connection to transfer one or more images from the eyewear device to the mobile device;

after transferring the one or more images over the first protocol comprising the unencrypted BLE link layer connection, switching from the first protocol to a second protocol comprising an encrypted link to enable the eyewear device to communicate with an operating system of the mobile device to receive one or more notifications from the mobile device;

determining that the mobile device has received a new notification, based on additional data received from the mobile device over the second protocol comprising the encrypted link, the additional data being received by the processor of the eyewear device after the data comprising the filtering information is received by the processor of the eyewear device;

filtering, by the eyewear device, one or more notifications received from the mobile device based on the filtering information to discard a portion of the one or more notifications received from the mobile device and maintain other notifications received from the mobile device comprising the new notification;

determining that a combination of attributes of the new notification matches the first combination of notification attributes; and in response to determining that the combination of the attributes of the new notification matches the first combination of notification attributes, retrieving from the storage device of the eyewear device, a first visual indicator animation that represents the first alert; and activating a visual indicator of the eyewear device in accordance with the retrieved first visual indicator animation to generate the first alert on the eyewear device.

20. A non-transitory machine-readable storage medium comprising instructions that, when executed by one or more processors of a machine, cause the machine to perform operations comprising:

receiving, by an eyewear device, from a mobile device, data indicative of a first combination of notification attributes that trigger a first alert on the eyewear device, the data received by the one or more processors of the eyewear device from the mobile device comprising filtering information used to control whether the first alert is triggered, based at least on a source of a given notification, and a given animation pattern of the first alert;

communicating between the eyewear device and the mobile device over a first protocol comprising an unencrypted Bluetooth Low Energy (BLE) link layer connection to transfer one or more images from the eyewear device to the mobile device;

after transferring the one or more images over the first protocol comprising the unencrypted BLE link layer connection, switching from the first protocol to a second protocol comprising an encrypted link to enable the eyewear device to communicate with an operating system of the mobile device to receive one or more notifications from the mobile device;

determining that the mobile device has received a new notification, based on additional data received from the mobile device over the second protocol comprising the encrypted link, the additional data being received by the processor of the eyewear device after the data comprising the filtering information is received by the processor of the eyewear device;

filtering, by the eyewear device, one or more notifications received from the mobile device based on the filtering information to discard a portion of the one or more notifications received from the mobile device and maintain other notifications received from the mobile device comprising the new notification;

determining that a combination of attributes of the new notification matches the first combination of notification attributes; and in response to determining that the combination of the attributes of the new notification matches the first combination of notification attributes, retrieving from a storage device of the eyewear device, a first visual indicator animation that represents the first alert; and activating a visual indicator of the eyewear device in accordance with the retrieved first visual indicator animation to generate the first alert on the eyewear device.

* * * * *